US012021399B2

(12) United States Patent
Kano et al.

(10) Patent No.: US 12,021,399 B2
(45) Date of Patent: Jun. 25, 2024

(54) BATTERY PACK WITH CONTROL CIRCUIT CONFIGURED TO BE SWITCHED FROM A CONTROLLED-OPERATION STATE TO A LOWER POWER STATE IN RESPONSE TO A COMMUNICATION-STOP TIME EXCEEDING A STORED STATE SWITCHING THRESHOLD

(71) Applicant: MAKITA CORPORATION, Anjo (JP)

(72) Inventors: Hayato Kano, Anjo (JP); Toru Yamada, Anjo (JP); Minoru Gyoda, Anjo (JP)

(73) Assignee: MAKITA CORPORATION, Anjo (JP)

( * ) Notice: Subject to any disclaimer, the term of this patent is extended or adjusted under 35 U.S.C. 154(b) by 283 days.

(21) Appl. No.: 16/868,055

(22) Filed: May 6, 2020

(65) Prior Publication Data

US 2020/0381930 A1 Dec. 3, 2020

(30) Foreign Application Priority Data

May 29, 2019 (JP) .................................. 2019-100294

(51) Int. Cl.
*H01M 10/42* (2006.01)
*H01M 10/44* (2006.01)
(Continued)

(52) U.S. Cl.
CPC ....... *H02J 7/00036* (2020.01); *H01M 10/425* (2013.01); *H01M 10/44* (2013.01);
(Continued)

(58) Field of Classification Search
CPC .... H02J 7/00036; H02J 7/0013; H02J 7/0071; H02J 2007/0062; H01M 2010/4271;
(Continued)

(56) References Cited

U.S. PATENT DOCUMENTS 5,057,383 A * 10/1991 Sokira ................ G01R 31/3842
429/93
5,625,880 A * 4/1997 Goldburg ............... H01Q 1/246
340/7.22
(Continued)

FOREIGN PATENT DOCUMENTS

CN 111163505 A * 5/2020
JP 2004122431 A * 4/2004
(Continued)

OTHER PUBLICATIONS

Office Action from the Japanese Patent Office dispatched Apr. 4, 2023, in related JP application No. 2019-100294, and machine translation thereof.

*Primary Examiner* — John T Trischler
(74) *Attorney, Agent, or Firm* — J-TEK LAW PLLC; Jeffrey D. Tekanic; Scott T. Wakeman

(57) ABSTRACT

A battery pack includes one or more battery cells, a control circuit, a communication circuit, and a switching control circuit. The switching control circuit is configured to switch the control circuit from a controlled-operation state to a low-power operation state in response to a communication-stop time exceeding a state-switching threshold, the communication-stop time being a duration of a state in which the control circuit or the communication circuit detects no communication with the charger, and the state-switching threshold being determined in advance, so that power consumption of the control circuit can be reduced upon completion of a charging operation.

1 Claim, 3 Drawing Sheets

US 12,021,399 B2

Page 2

(51) Int. Cl.
*H01M 10/46* (2006.01)
*H02J 7/00* (2006.01)

(52) U.S. Cl.
CPC ............ *H01M 10/46* (2013.01); *H02J 7/0013* (2013.01); *H02J 7/0071* (2020.01); *H01M 2010/4271* (2013.01); *H01M 2010/4278* (2013.01)

(58) Field of Classification Search
CPC ....... H01M 2010/4278; H01M 10/425; H01M 10/44; H01M 10/46
USPC ........................................................ 320/112
See application file for complete search history.

(56) References Cited

U.S. PATENT DOCUMENTS

| | | | | |
|---|---|---|---|---|
| 6,208,117 | B1 * | 3/2001 | Hibi | H02J 7/0014 320/136 |
| 6,545,447 | B1 * | 4/2003 | Smith | H01M 10/44 320/132 |
| 7,564,214 | B2 * | 7/2009 | Sasaki | H01M 10/425 320/106 |
| 7,619,386 | B2 * | 11/2009 | Sasaki | H02J 7/0029 320/106 |
| 7,791,312 | B2 * | 9/2010 | Kook | H02J 7/0044 320/108 |
| 7,936,147 | B2 * | 5/2011 | Kook | H02J 50/10 320/108 |
| 8,078,228 | B2 * | 12/2011 | Lim | H04L 67/26 455/566 |
| 8,154,248 | B2 * | 4/2012 | Cruise | H02J 7/007194 320/155 |
| 8,210,273 | B2 * | 7/2012 | Suzuki | H01M 10/482 173/2 |
| 8,330,426 | B2 * | 12/2012 | Suzuki | H01M 10/4207 320/157 |
| 8,358,108 | B2 * | 1/2013 | Seman, Jr. | H01M 50/20 320/134 |
| 8,359,073 | B2 * | 1/2013 | Kamiyama | H02J 50/10 455/573 |
| 8,384,349 | B2 * | 2/2013 | Suzuki | H01M 10/4257 320/112 |
| 8,441,230 | B2 * | 5/2013 | Boyles | H02J 7/0045 320/107 |
| 8,611,268 | B1 * | 12/2013 | Thandaveswaran | H04W 52/0206 455/552.1 |
| 8,742,724 | B2 * | 6/2014 | Suzuki | H01M 10/486 320/132 |
| 8,749,204 | B2 * | 6/2014 | Majima | H01M 10/48 320/149 |
| 8,795,438 | B2 * | 8/2014 | Rubin | A61L 2/28 134/56 R |
| 8,796,964 | B2 * | 8/2014 | Dietl | B25F 5/00 318/400.07 |
| 8,803,364 | B2 * | 8/2014 | Onishi | H02J 7/0047 307/104 |
| 8,904,207 | B2 * | 12/2014 | Kwon | H04W 52/0225 713/320 |
| 9,060,337 | B2 | 6/2015 | Sanders | H02J 4/00 |
| 9,075,381 | B2 * | 7/2015 | Hiraguchi | G03G 15/5004 |
| 9,077,054 | B2 * | 7/2015 | Hanai | H01M 10/482 |
| 9,136,721 | B2 * | 9/2015 | Umemura | H02J 7/00 |
| 9,172,922 | B1 * | 10/2015 | Kasmir | H04L 12/2827 |
| 9,179,109 | B1 * | 11/2015 | Kasmir | G08B 13/19684 |
| 9,203,249 | B2 * | 12/2015 | Noda | H02J 7/0036 |
| 9,275,319 | B2 * | 3/2016 | Sugimoto | G06K 15/4055 |
| 9,306,478 | B2 * | 4/2016 | Kischka | H02P 3/18 |
| 9,317,219 | B2 * | 4/2016 | Kawakita | G06F 13/36 |
| RE46,111 | E * | 8/2016 | Kook | H04B 5/0037 |
| 9,466,860 | B2 * | 10/2016 | Noda | H01M 10/46 |
| 9,626,258 | B2 * | 4/2017 | Halker | B60L 3/0023 |
| 9,642,081 | B2 * | 5/2017 | Maruhashi | H04W 52/0206 |
| 9,647,479 | B2 * | 5/2017 | Mori | G05B 19/058 |
| 9,743,049 | B2 * | 8/2017 | Scalisi | H04W 4/50 |
| 9,853,471 | B2 * | 12/2017 | Keates | H02J 7/0071 |
| 9,876,857 | B2 * | 1/2018 | Kim | H04L 67/12 |
| 9,883,066 | B2 * | 1/2018 | Shin | G06F 3/12 |
| 9,913,081 | B1 * | 3/2018 | Thanayankizil | H04L 12/413 |
| 9,917,464 | B2 * | 3/2018 | Tsai | H02J 7/007182 |
| 9,991,725 | B2 * | 6/2018 | Song | H02J 7/0045 |
| 10,112,501 | B2 * | 10/2018 | Ishibashi | B60L 50/52 |
| 10,146,647 | B2 * | 12/2018 | Halker | B60L 53/66 |
| 10,172,089 | B2 * | 1/2019 | Jain | H04W 4/029 |
| 10,212,234 | B2 * | 2/2019 | Kim | H04L 67/12 |
| 10,236,701 | B2 * | 3/2019 | Song | H02J 7/0045 |
| 10,256,647 | B2 * | 4/2019 | Song | H02J 7/00 |
| 10,466,305 | B2 * | 11/2019 | Yamada | H02J 7/0021 |
| 10,572,199 | B2 * | 2/2020 | Kawakami | G06F 3/1284 |
| 10,749,356 | B2 * | 8/2020 | Takeda | H02P 23/14 |
| 10,778,017 | B2 * | 9/2020 | Park | H02H 5/12 |
| 10,802,078 | B2 * | 10/2020 | Tamegai | G01R 19/16542 |
| 11,051,248 | B2 * | 6/2021 | Doherty | H04W 52/0229 |
| 11,206,664 | B2 * | 12/2021 | Brown | H04W 56/001 |
| 11,211,812 | B2 * | 12/2021 | Zhang | H02J 7/0013 |
| 11,212,797 | B2 * | 12/2021 | Brown | H04W 52/50 |
| 11,610,475 | B2 * | 3/2023 | Valentini | H01M 10/4221 |
| 11,699,915 | B2 * | 7/2023 | Zhang | H02J 7/0047 320/134 |
| 11,735,953 | B2 * | 8/2023 | Li | H02J 9/068 320/137 |
| 2004/0090195 | A1 * | 5/2004 | Motsenbocker | B60L 58/33 318/109 |
| 2004/0180702 | A1 * | 9/2004 | Hughes | H04W 52/0241 455/574 |
| 2004/0189245 | A1 * | 9/2004 | Teraoka | H02J 7/0031 320/107 |
| 2005/0127868 | A1 * | 6/2005 | Calhoon | H02J 50/10 320/108 |
| 2005/0248311 | A1 * | 11/2005 | Komaki | G06F 1/30 320/112 |
| 2006/0029024 | A1 * | 2/2006 | Zeng | H04W 52/0248 370/335 |
| 2006/0107080 | A1 * | 5/2006 | Inui | G06F 1/3203 713/300 |
| 2006/0119315 | A1 * | 6/2006 | Sasaki | H02J 7/00047 320/106 |
| 2006/0119316 | A1 * | 6/2006 | Sasaki | H01M 10/425 320/106 |
| 2008/0049700 | A1 * | 2/2008 | Shah | H04W 52/0225 455/425 |
| 2009/0058368 | A1 * | 3/2009 | Seman, Jr. | H02J 7/0069 320/137 |
| 2009/0174264 | A1 * | 7/2009 | Onishi | H02J 50/12 307/104 |
| 2009/0261778 | A1 * | 10/2009 | Kook | H04B 5/0037 320/108 |
| 2010/0013319 | A1 * | 1/2010 | Kamiyama | H02J 50/60 307/104 |
| 2010/0029303 | A1 * | 2/2010 | Lim | H04L 12/1859 455/466 |
| 2010/0077404 | A1 * | 3/2010 | Oh | H05B 47/195 719/313 |
| 2010/0084150 | A1 * | 4/2010 | Suzuki | H01M 50/543 173/2 |
| 2010/0085008 | A1 * | 4/2010 | Suzuki | H01M 10/482 320/112 |
| 2010/0085010 | A1 * | 4/2010 | Suzuki | H01M 10/4257 320/132 |
| 2010/0085012 | A1 * | 4/2010 | Cruise | H02J 7/007194 320/155 |
| 2010/0085020 | A1 * | 4/2010 | Suzuki | H01M 10/4207 320/157 |
| 2010/0181966 | A1 * | 7/2010 | Sakakibara | H01M 50/569 320/136 |
| 2010/0289450 | A1 * | 11/2010 | Kook | H04B 5/0031 320/108 |
| 2011/0012560 | A1 * | 1/2011 | Sakakibara | H01M 10/441 320/118 |

(56) References Cited

U.S. PATENT DOCUMENTS

| | | | |
|---|---|---|---|
| 2011/0058288 A1* | 3/2011 | Vanko | H02P 23/26 361/33 |
| 2011/0099144 A1* | 4/2011 | Levy | B60L 53/30 707/609 |
| 2011/0115437 A1* | 5/2011 | Kasai | H02J 7/00309 320/134 |
| 2011/0121783 A1* | 5/2011 | Boyles | H02J 7/0072 320/113 |
| 2011/0158212 A1* | 6/2011 | Sakai | H04W 8/005 455/509 |
| 2011/0187329 A1* | 8/2011 | Majima | G01R 31/52 320/149 |
| 2011/0197921 A1* | 8/2011 | Rubin | A61B 90/70 134/18 |
| 2011/0240320 A1* | 10/2011 | Umemura | H02J 7/0068 173/46 |
| 2011/0248670 A1* | 10/2011 | Yamazaki | H02J 7/0071 320/107 |
| 2012/0076523 A1* | 3/2012 | Kojima | G03G 15/5004 399/70 |
| 2012/0187851 A1* | 7/2012 | Huggins | H02J 50/80 315/159 |
| 2012/0223663 A1* | 9/2012 | Dietl | H02K 29/06 318/139 |
| 2012/0230319 A1* | 9/2012 | Zaitsu | H04W 52/0229 370/338 |
| 2012/0268580 A1* | 10/2012 | Kim | G06F 3/017 348/77 |
| 2013/0033233 A1* | 2/2013 | Noda | H01M 10/48 320/134 |
| 2013/0082658 A1* | 4/2013 | Hanai | H01M 10/482 320/118 |
| 2013/0099722 A1* | 4/2013 | Umemura | H02J 7/00 320/101 |
| 2013/0113427 A1* | 5/2013 | Noda | H02J 7/00306 320/112 |
| 2013/0293197 A1* | 11/2013 | Sakakibara | H02J 7/0068 320/118 |
| 2014/0038471 A1* | 2/2014 | Yang | H01M 50/572 439/754 |
| 2014/0147157 A1* | 5/2014 | Hiraguchi | G03G 15/5004 399/88 |
| 2014/0310452 A1* | 10/2014 | Kawakita | G06F 13/36 711/105 |
| 2015/0006395 A1* | 1/2015 | Chu | H02J 50/10 705/44 |
| 2015/0035488 A1* | 2/2015 | Mori | H02J 7/0049 320/112 |
| 2015/0091480 A1* | 4/2015 | Kischka | H02P 3/22 318/374 |
| 2015/0103708 A1* | 4/2015 | Kang | H04W 76/14 370/311 |
| 2015/0278038 A1* | 10/2015 | Halker | H04B 5/0037 714/3 |
| 2015/0278666 A1* | 10/2015 | Sugimoto | G06K 15/4055 358/1.14 |
| 2015/0304947 A1* | 10/2015 | Maruhashi | H04W 48/08 370/311 |
| 2015/0318720 A1* | 11/2015 | Aradachi | H02J 7/007 320/106 |
| 2015/0326046 A1* | 11/2015 | Song | H02J 7/00 320/165 |
| 2016/0059730 A1 | 3/2016 | Ishibashi et al. | |
| 2016/0065409 A1* | 3/2016 | Kim | H04L 67/12 709/223 |
| 2016/0172886 A1* | 6/2016 | Keates | H02J 7/00 320/130 |
| 2016/0185462 A1* | 6/2016 | Edwards | H02P 29/0243 701/34.4 |
| 2016/0254574 A1* | 9/2016 | Li | G01R 31/36 320/107 |
| 2016/0330412 A1* | 11/2016 | Scalisi | H04N 7/186 |
| 2016/0330413 A1* | 11/2016 | Scalisi | H04N 7/186 |
| 2017/0013153 A1* | 1/2017 | Shin | H04N 1/00891 |
| 2017/0063111 A1* | 3/2017 | Toya | H02J 7/0029 |
| 2017/0110910 A1* | 4/2017 | Zeine | H02J 50/80 |
| 2017/0351587 A1* | 12/2017 | Halker | B60L 53/126 |
| 2018/0069722 A1* | 3/2018 | Scalisi | H04L 12/2825 |
| 2018/0146043 A1* | 5/2018 | Kim | H04L 67/12 |
| 2018/0192374 A1* | 7/2018 | Jain | H04W 4/029 |
| 2018/0205244 A1* | 7/2018 | Ichikawa | B25F 5/02 |
| 2018/0248396 A1* | 8/2018 | Keates | H02J 7/00 |
| 2018/0254645 A1* | 9/2018 | Song | H02J 7/0045 |
| 2018/0254646 A1* | 9/2018 | Song | H02J 7/342 |
| 2018/0294656 A1* | 10/2018 | Iwata | H02J 7/00 |
| 2018/0306866 A1* | 10/2018 | Tamegai | G01R 31/3648 |
| 2018/0351376 A1* | 12/2018 | Park | H02J 7/0029 |
| 2019/0034134 A1* | 1/2019 | Kawakami | H04W 52/0216 |
| 2019/0115772 A1* | 4/2019 | Takeda | H02J 7/0063 |
| 2019/0296581 A1* | 9/2019 | Onishi | H02J 7/00 |
| 2020/0050338 A1* | 2/2020 | Choi | H02J 50/12 |
| 2020/0106081 A1* | 4/2020 | Suzuki | B25F 5/00 |
| 2020/0176746 A1* | 6/2020 | Yamada | H01M 50/502 |
| 2020/0221912 A1* | 7/2020 | Caspar | G08C 17/00 |
| 2020/0227931 A1* | 7/2020 | Yamaguchi | H01M 10/448 |
| 2020/0288395 A1* | 9/2020 | Doherty | H04W 52/028 |
| 2020/0295585 A1* | 9/2020 | Ota | H01M 10/486 |
| 2020/0296723 A1* | 9/2020 | Brown | H04W 12/02 |
| 2020/0300037 A1* | 9/2020 | Blair | H02J 1/08 |
| 2020/0350777 A1* | 11/2020 | Zhang | H02J 7/0036 |
| 2020/0351873 A1* | 11/2020 | Brown | H04W 74/085 |
| 2020/0381930 A1* | 12/2020 | Kano | H02J 7/0013 |
| 2021/0006753 A1* | 1/2021 | Scalisi | H04N 7/186 |
| 2021/0075243 A1* | 3/2021 | Uesugi | H01M 10/48 |
| 2021/0098832 A1* | 4/2021 | Kobayakawa | G01R 31/3828 |
| 2021/0228040 A1* | 7/2021 | Mitsui | H01M 10/486 |
| 2021/0274990 A1* | 9/2021 | Mitsui | H02J 7/00036 |
| 2021/0282615 A1* | 9/2021 | Caspar | G08C 17/00 |
| 2021/0305661 A1* | 9/2021 | Gyoda | H01M 50/284 |
| 2021/0312793 A1* | 10/2021 | Valentini | A47L 11/4005 |
| 2021/0367456 A1* | 11/2021 | Toula | H02J 50/12 |
| 2022/0060049 A1* | 2/2022 | Li | H02J 7/007182 |
| 2022/0077704 A1* | 3/2022 | Zhang | H02J 7/0047 |
| 2022/0295275 A1* | 9/2022 | Lee | B60L 1/00 |
| 2023/0053161 A1* | 2/2023 | Liu | H02J 1/122 |
| 2023/0160966 A1* | 5/2023 | Song | H02J 1/102 702/63 |

FOREIGN PATENT DOCUMENTS

| | | | |
|---|---|---|---|
| JP | 2006228662 A | | 8/2006 |
| JP | 2011109768 A | | 6/2011 |
| JP | 2012186601 A | * | 9/2012 |
| JP | 2013013184 A | | 1/2013 |
| JP | 5270380 B2 | * | 8/2013 ............ B25F 5/00 |
| JP | 5545764 B2 | * | 7/2014 |
| JP | 2017019065 A | | 1/2017 |
| WO | 2014162645 A | | 10/2014 |
| WO | 2017010160 A1 | | 1/2017 |

\* cited by examiner

BATTERY PACK WITH CONTROL CIRCUIT CONFIGURED TO BE SWITCHED FROM A CONTROLLED-OPERATION STATE TO A LOWER POWER STATE IN RESPONSE TO A COMMUNICATION-STOP TIME EXCEEDING A STORED STATE SWITCHING THRESHOLD

CROSS-REFERENCE

This application claims priority to Japanese patent application serial number 2019-100294, filed on May 29, 2019, the contents of which are incorporated herein by reference in their entirety.

TECHNICAL FIELD

The present disclosure relates to a battery pack that is rechargeable by a charger and may be utilized to supply power to electrical equipment, such as a power tool, a light, etc.

BACKGROUND ART

Rechargeable battery packs are charged by being connected to a charger and are configured such that, for example, after being charged, the battery pack is connected to an electric work machine (e.g., a power tool) or the like to supply electrical power (current) thereto.

For example, the battery pack disclosed in Japanese Laid-open Patent Publication 2011-109768 comprises: a positive-electrode terminal 2 (all reference numbers in this background art section refer to the figures of JP 2011-109768) and a negative-electrode terminal 3 for conducting a charging current from the charger or a discharging current to the electric work machine; and a communication terminal 4 that transmits and receives various information to and from the charger. The communication terminal comprises a pair of external-connection terminals 4a, 4b.

This known battery pack is configured such that, when the battery pack is connected to the charger (or to the electric work machine), a control part (a microprocessor) of the battery pack is started when the pair of external-connection terminals are electrically connected to one another via a communication terminal 25 of the charger (or the electric work machine). On the other hand, when the battery pack is removed from the charger (or the electric work machine), the electrical connection between the pair of external-connection terminals via the communication terminal is disconnected, and the control part (the microprocessor) stops (shuts down).

SUMMARY OF THE INVENTION

However, there is a possibility that, if the above-described known battery pack remains connected to the charger after charging by the charger has been completed, then charging power stored in the battery cell(s) will be wastefully consumed, thereby discharging the battery cell(s).

For example, if the charger transitions to a sleep mode after charging of the battery pack has been completed, then electrical power will no longer be supplied from the charger to the battery pack; thereafter, if the normal-operation state of the battery pack continues (i.e. the control part of the battery pack does not stop its operation by, e.g., entering into a sleep mode), then the control part of the battery pack will (unnecessarily) consume electrical power that was stored in the battery cell(s) during the charging operation.

That is, when the battery pack remains electrically connected to the charger after charging of the battery pack has been completed and the charger has transitioned to the sleep mode, the pair of external-connection terminals remain electrically connected via the communication terminal. At this time, because the control part of the battery pack continues its normal-operation state without stopping its operation, the charging power stored in the battery cell(s) may be wastefully consumed by the control part.

Accordingly, it is one non-limiting object of the present disclosure to provide a battery pack that can reduce the wasteful consumption of charging power stored in the battery cell(s), even if the battery pack remains electrically connected to a charger after charging has been completed.

In one aspect of the present disclosure, a battery pack is rechargeable by a charger and comprises at least one rechargeable battery cell, a control part, a communication part, and a switching-control part.

The control part is configured such that it is switchable between a plurality of operation states (operation modes), which include a controlled-operation state (charging mode and discharging mode) and a low-power operation state (low power mode). That is, in the controlled-operation state (mode), the charging and the discharging of the battery cell(s) are controlled, in order to recharge depleted battery cell(s) and to power an external (separate, discrete) electrical equipment, respectively. On the other hand, in the low-power operation state (low power mode), the battery cell(s) is/are not charged by a charger or discharged to power an electrical equipment, such that electric power consumption is less than in the controlled-operation state. The communication part is configured to enable (execute, transmit) communications at least from the battery pack to the charger.

The switching-control part is configured to compare a communication-stop time and (to, with) a state-switching determination value. The operation state of the control part is not switched if the communication-stop time is less than or equal to the state-switching determination value. On the other hand, the operation state of the control part is switched to the low-power operation state (low power mode) if the communication-stop time is greater than the state-switching determination value. The communication-stop time is the duration (time period), during which the communication part detects (executes) no communication with the charger. The state-switching determination value is a predetermined determination value, i.e. a pre-set value (time period) stored in memory of the control part.

When the communication-stop time exceeds the state-switching determination value after the battery pack has been connected to the charger and charging has been completed, the battery pack can reduce the amount of electric power consumed by the control part of the battery pack by switching the operation state of the control part to the low-power operation state (low power mode). Thereby, the battery pack can reduce the wasteful consumption of the electric power that was charged (stored) in the battery cell(s) during the last recharging operation.

It is noted that the state-switching determination value may, for example, set a predetermined determination value for use in a transition determination regarding whether to switch the operation state of the control part to the low-power operation state.

In a further embodiment of the battery pack described above, the communication part may be configured to enable serial communication with the charger. In such an embodiment, not only is it possible to enable (execute, perform) the communication of simple ON/OFF signals, but it also becomes possible to transmit and receive signals that contain a variety of types of information.

In addition or in the alternative, the communication part may be configured to enable (execute, perform) duplex (bidirectional or two-way) communication between the battery pack and the charger. In such an embodiment, information can be exchanged back and forth between the communication part of the battery pack and the charger.

Consequently, the battery pack can receive information related to the state (normal state, abnormal state, etc.) of the charger and can notify the charger of the information related to the state (normal state, abnormal state, etc.) of the battery pack.

In addition or in the alternative, the control part may be configured such that, in the controlled-operation state, the control part executes a selected one of a plurality of processing modes. Furthermore, the switching-control part compares the communication-stop time and (to, with) the state-switching determination value even while any one of the plurality of processing modes of the control part is being executed. The plurality of processing modes may include a charging-standby mode, a charging mode, a charging-completed mode, and a charging-abnormal mode.

In such a battery pack, the control part can switch to the low-power operation state (low power mode) regardless of the type of the processing mode currently being executed by the control part. Thereby, the battery pack can reliably achieve a reduction in the amount of electric power stored in the battery cell(s) consumed by the control part of the battery pack.

In addition or in the alternative, the communication part may be configured to be capable of receiving a sleep-transition signal from the charger. In such an embodiment, if the communication part of the battery pack receives a sleep-transition signal from the charger, then the control part may transition (switch) to the low-power operation state (low power).

In such a battery pack, the control part may transition to the low-power operation state upon receiving to the sleep-transition signal from the charger, thereby reducing the amount of electric power consumed by the control part.

Further objects, aspects, embodiments and advantages of the present teachings will become apparent to a person skilled in the art upon reading the following detailed description in conjunction with the appended claims and drawings.

DETAILED DESCRIPTION OF THE INVENTION

Exemplary embodiments of the present disclosure are explained below, with reference to the drawings.

It is noted that the present disclosure is not limited whatsoever to the embodiments below, and it is understood that various configurations may be effected as long as they fall within the technical scope of the present disclosure.

1. First Embodiment 1-1. Overall Configuration

The configuration of a battery pack 100 according to the present embodiment will now be explained, with reference to FIG. 1.

The battery pack (battery cartridge) 100 is configured to supply electric power to an external (discrete, separate) equipment (e.g., to a power tool) by being connected to the external equipment and is also configured to receive a supply of electric power from an external equipment (e.g., from a charger) by being connected to the external equipment. Thus, representative, non-limiting examples of external equipment according to the present teachings include a charger 600, an electric work machine (e.g., power tool), a light, etc. The charger 600 supplies electric power to recharge the battery pack 100. The electric work machine and the light operate (are powered) by receiving the supply of electric power from the battery pack 100. Representative, non-limiting examples of electric work machines according to the present teachings include: handheld or benchtop power tools, such as driver drills, hammer drills, miter saws, chain saws, grinders, etc., and outdoor power equipment, such as lawn mowers, hedge trimmers, clippers, etc.

Figure 1:
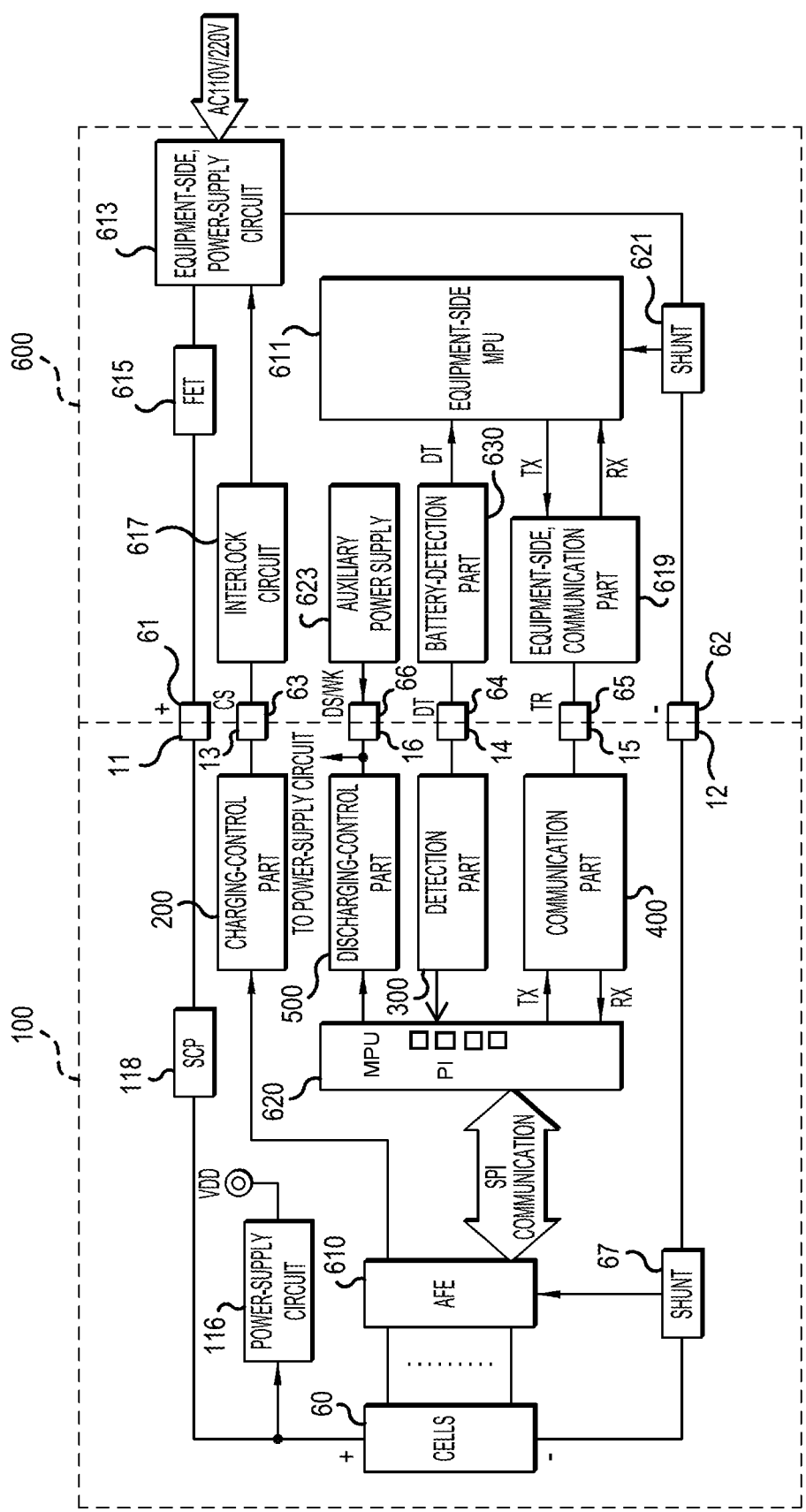
FIG. 1 is a block diagram that shows an overview of a battery pack and a charger according to a first embodiment of the present disclosure.

As shown in FIG. 1, the battery pack 100 is configured to receive a supply of electric power from the charger 600 by being physically and electrically connected to the charger 600.

The battery pack 100 comprises a battery (one or more rechargeable battery cells, such as lithium-ion battery cells) 60, an analog front end 610 (hereinbelow, also called AFE 610), a microprocessor unit (controller) 620 (hereinbelow, also called MPU 620), a power-supply circuit 116, and a self control protector (protection circuit module) 118 (hereinbelow, also called SCP 118).

Furthermore, the battery pack 100 comprises a positive-electrode terminal 11, a negative-electrode terminal 12, a CS terminal 13, a DT terminal 14, a TR terminal 15, a DS terminal 16, a charging-control part 200 (hereinbelow, also called CS circuit 200), a detection part 300 (hereinbelow, also called DT circuit 300), a communication part 400 (hereinbelow, also called UART half-duplex I/F circuit 400), and a discharging-control part 500 (hereinbelow, also called DS circuit 500).

The battery 60 preferably includes a plurality of rechargeable battery cells that are electrically connected in series and/or in parallel. The rated voltage of the battery 60 is, for example, 18 V. It is noted that the rated voltage of the battery 60 is not limited to 18 V and may be 36 V, 72 V, or the like. Generally speaking, batteries 60 according to the present teachings may be configured to output any rated voltage within a range of about 10-100 V, such as, e.g., 14-40 V.

The MPU 620 comprises a microcomputer, which comprises a CPU, ROM, RAM, an I/O interface, and the like, and executes various types of control (programs—computer-readable instructions), including control of the charging and discharging of the battery 60. In addition, the MPU 620 comprises a plurality of interrupt ports PI, into which various signals are input. When the detection part 300 detects the state in which a connection is made with the charger 600 and one or more prescribed conditions is (are) met, the MPU 620 transitions from a normal-operation mode (controlled-operation state) to a sleep mode (low-power operation state or low power mode), in which electric power consumption is curtailed by stopping a portion of the operation of the MPU 620, as will be further explained below. Thereafter, if a signal is input to any of the interrupt ports PI while the MPU 620 is in the sleep mode, the MPU 620 wakes up and transitions to the normal-operation mode. For example, if the detection part 300 detects the state in which the battery pack 100 is electrically connected with (to) the charger 600 and connection-detection information (signal) Sa1 is input via one of the interrupt ports PI, then the MPU 620 wakes up. On the other hand, if the removal of the battery pack 100 from the charger 600 is detected and one or more prescribed conditions is (are) met, then the MPU 620 transitions to the sleep mode, as will be further explained below.

In other words, the MPU 620 is configured such that it is switchable to any of a plurality of operation modes (operation states), including the normal-operation mode (controlled-operation state) and the sleep (low power) mode (low-power operation state). In the controlled-operation state, the battery 60 may be charged by the charger 600 or discharged to power (drive) an electrical equipment. In the low-power operation state (sleep or low power mode), the battery 60 is not charged by the charger 600 or discharged to power (drive) an electrical equipment and the processing functions of the MPU 620 are at least partially shut down (powered down), such that electric power consumption of the MPU 620, in particular, is less than in the controlled-operation state. For example, in the sleep mode, the MPU may shut off power to unneeded subsystems and place the RAM into a minimum power state that is just sufficient to retain its data. Instead of a sleep mode, the MPU 602 may instead be put into a hibernation mode and/or a hybrid mode that combines aspects of a sleep mode and a hibernation mode. In the hibernation mode, any data in the RAM may be written into the ROM so that no power to the RAM is necessary, thereby providing even lower (or even zero) power consumption.

The AFE 610 is an analog circuit and, in accordance with an instruction from the MPU 620, detects the cell voltage of each battery cell contained in the battery 60 and detects the cell temperature of at least one battery cell via a thermistor (not shown) provided on the battery 60. In addition, the AFE 610 executes a battery cell-balancing process, which equalizes the remaining-charge amounts of the battery cells. In addition, the AFE 610 detects the board temperature via a thermistor (not shown) provided on the circuit board. Furthermore, the AFE 610 detects, via a shunt resistor 67, the charging current that is flowing into the battery 60 (i.e. when the battery pack 100 is connected to the charger 600) and alternately, the discharging current that is flowing out of the battery 60 (e.g., when the battery pack 100 is connected to a power tool or the like). Furthermore, the AFE 610 converts the detected values of the detected cell voltage, cell temperature, board temperature, and charging/discharging currents into digital signals and outputs the converted digital signals to the MPU 620.

In addition, the AFE 610 determines, based on the detected state of the battery 60, whether charging of the battery 60 is enabled or disabled, generates a charging-enabled signal or a charging-disabled signal, and outputs these signals to the charging-control part 200.

The power-supply circuit 116 comprises a voltage regulator. When the battery pack 100 (in particular, the MPU 620) is shut down, the voltage regulator receives a supply of electric power from an auxiliary power supply 623 of the charger 600 via the DS terminal 16 and generates a power-supply voltage VDD for driving the internal circuitry. The charger 600 comprises an equipment-side DS terminal 66, which is connected to the DS terminal 16. The equipment-side DS terminal 66 is connected to the auxiliary power supply 623.

If the battery pack 100 enters an over-discharged state, then it is shut down. When the MPU 620 receives the supply of the power-supply voltage VDD generated by the power-supply circuit 116, the MPU 620 starts up from the shutdown state and outputs a charging-enabled signal to the charger 600 if the battery 60 is in a rechargeable state. When the battery voltage reaches a prescribed voltage, electric power from the battery 60 is supplied to the power-supply circuit 116. The power-supply circuit 116 receives the supply of electric power from the battery 60 and generates the power-supply voltage VDD.

The SCP 118 is provided in (in series with) a positive-electrode-side connection line (wire), which connects the positive-electrode side of the battery 60 and the positive-electrode terminal 11. The SCP 118 comprises a fuse and a circuit configured to blow (e.g., melt, thereby disconnecting or opening) the fuse in response to an instruction from the MPU 620. When the fuse of the SCP 118 has been blown, the positive-electrode-side connection line is broken (interrupted) and the battery 60 enters the state in which charging and discharging via the positive-electrode terminal 11 is impossible. That is, the battery 60 enters the state in which it is non-reusable unless and until the fuse is replaced.

If charging does not stop even though the MPU 620 has output a charging-disabled signal from the battery pack 100 to the charger 600, or if discharging does not stop even though the MPU 620 has output a discharging-disabled signal from the battery pack 100 to the external equipment, then, as a last measure to ensure safety, the MPU 620 outputs an instruction to the SCP 118 to blow (melt, interrupt) the fuse. That is, the SCP 118 is a circuit for redundantly ensuring safety to prevent or reduce the likelihood of an overcharged state or an over-discharged state of the battery 60. The SCP 118 may periodically diagnose whether the circuit that blows the fuse is operating normally and output the result of that diagnostic to the MPU 620. If the SCP 118 does not have a self-diagnostic function, then the SCP 118 may determine whether operation is normal by causing the MPU 620 to execute an SCP diagnostic process.

The MPU 620 determines the state of the battery 60 based on various input signals. Furthermore, based on the determined state of the battery 60, the MPU 620 determines whether to enable or disable charging of the battery 60 and generates a charging-enabled signal or a charging-disabled signal, respectively. The MPU 620 outputs the charging-enabled signal or the charging-disabled signal to the charging-control part 200 via the AFE 610. In addition, based on the determined state of the battery 60, the MPU 620 determines whether to enable or disable discharging from the battery 60, generates a discharging-enabled signal or a discharging-disabled signal, respectively, and outputs such to the discharging-control part 500. In addition, to increase responsiveness to the external equipment (in particular, the electric work machine), the MPU 620 may generate a discharging-enabled signal during the sleep mode and output the discharging-enabled signal to the discharging-control part 500.

If the battery pack 100 is connected to the external equipment (not shown), then the positive-electrode terminal 11 and the negative-electrode terminal 12 are respectively connected to an equipment-side, positive-electrode terminal and to an equipment-side, negative-electrode terminal of the external equipment. If the battery pack 100 is connected to the charger 600, then the positive-electrode terminal 11 and the negative-electrode terminal 12 are respectively connected to an equipment-side, positive-electrode terminal 61 and to an equipment-side, negative-electrode terminal 62 of the charger 600. In these connected states, it becomes possible to supply electric power from the battery pack 100 to the external equipment or to supply electric power from the charger 600 to the battery pack 100.

The CS terminal 13 is connected to the charging-control part 200 (the CS circuit 200) and is a terminal for outputting a charging-enabled signal or a charging-disabled signal to the charger 600 when the battery pack 100 is connected to the charger 600. If a charging-enabled signal is input from the AFE 610, then the charging-control part 200 outputs a charging-enabled signal via the CS terminal 13. In addition, if a charging-disabled signal is input from the AFE 610, then the charging-control part 200 outputs a charging-disabled signal via the CS terminal 13.

The charger 600 comprises an equipment-side CS terminal 63, which is connected to the CS terminal 13. The charger 600 comprises an interlock circuit 617, which is connected to the equipment-side CS terminal 63. The charger 600 comprises an equipment-side, power-supply circuit 613, which serves as a power supply that supplies DC power. The interlock circuit 617 enables an electric power-supply operation, which is performed by the equipment-side, power-supply circuit 613, while a charging-enabled signal is being received from the battery pack 100, and disables the electric power-supply operation, which is performed by the equipment-side, power-supply circuit 613, while a charging-disabled signal is being received from the battery pack 100. The equipment-side, power-supply circuit 613 is configured such that it is capable of supplying DC power by converting AC electrical power from a commercial power supply (e.g., 110 or 220 VAC) into DC power using an AC/DC converter or the like.

When the battery pack 100 is connected to the charger 600, the DT terminal 14 is connected to an equipment-side, communication terminal 64 of the charger 600. The equipment-side, communication terminal 64 is connected to a battery-detection part 630. The electric potential VDT of the DT terminal 14 changes in accordance with whether the charger 600 is in the unconnected state or the connected state. In addition, the electric potential VDT of the equipment-side, communication terminal 64 and the DT terminal 14 changes in accordance with whether the battery pack 100 is in the shutdown state or the non-shutdown state.

The battery-detection part 630 determines whether the electric potential VDT of the equipment-side, communication terminal 64 and the DT terminal 14 is an electric potential (or within a first range of electrical potentials) that indicates the shutdown state of the battery pack 100 or an electric potential (or within a second (different) range of electrical potentials) that indicates the non-shutdown state of the battery pack 100. Based on the determination result, the battery-detection part 630 detects shutdown information that indicates whether the battery pack 100 is in the shutdown state. If the battery-detection part 630 detects that the battery pack 100 is in the non-shutdown state, then the battery-detection part 630 turns ON a discharge switch 615, which is provided in (in series with) the positive-electrode-side connection line. The positive-electrode-side connection line is an electric power line that is provided between (electrically connects) the equipment-side, positive-electrode terminal 61 and the equipment-side, power-supply circuit 613.

Thereby, electric power is supplied from the charger 600 to the battery pack 100 and charging of the battery 60 is performed. However, if the battery-detection part 630 detects that the battery pack 100 is in the shutdown state, then the battery-detection part 630 turns OFF the discharge switch 615.

The DT terminal 14 is connected to the detection part 300 of the battery pack 100. The detection part 300 detects the electric potential VDT of the DT terminal 14 and detects the unconnected state or the connected state by determining, based on the detected electric potential VDT, whether the electric potential indicates that the charger 600 is in the unconnected state with respect to the battery pack 100. The detection part 300 outputs the detection result to the MPU 620 via the interrupt ports PI. It is noted that the detection part 300 may output the detection result to the AFE 610. In addition, the detection part 300 may output the detection result to both the MPU 620 and the AFE 610.

The MPU 620 acquires, based on the inputted detection result, equipment information that includes unconnected information, OFF information, and ON information. The equipment information (unconnected information, OFF information, and ON information) is information that is transmitted from the charger 600 to the battery pack 100 and is received by the battery pack 100.

The unconnected information indicates that the charger 600 is in the unconnected state with respect to the battery pack 100. The OFF information indicates that the charger 600 is connected to the battery pack 100 and that the discharge switch 615 is OFF. The ON information indicates that the charger 600 is connected to the battery pack 100 and that the discharge switch 615 is ON.

The TR terminal 15 is a serial communication terminal that is connected to the communication part 400. The communication part 400 comprises a half-duplex UART (universal asynchronous receiver/transmitter) circuit.

The charger 600 comprises an equipment-side TR terminal 65, which is connected to the TR terminal 15, and an equipment-side communication part 619, which is connected to the equipment-side TR terminal 65. The equipment-side communication part 619 comprises a half-duplex UART (universal asynchronous receiver/transmitter) circuit.

The charger 600 comprises an equipment-side MPU 611. The equipment-side MPU 611 comprises a microcomputer, which comprises a CPU, ROM, RAM, an I/O interface, and the like, and executes various types of control (programs—computer readable instructions), including control of the charging performed by the charger 600. The equipment-side MPU 611 detects, via a shunt resistor 621, a discharging current that flows from the equipment-side, power-supply circuit 613. If the detected discharging current is an abnormal value, then the equipment-side MPU 611, for example, switches the discharge switch 615 to the OFF state and thereby stops the battery 60 from being charged with a discharging current having an abnormal value (i.e. a current value outside of a prescribed (i.e. predetermined to be safe) charging current range).

When one or more prescribed conditions has (have) been satisfied after charging of the battery pack 100 has completed, the equipment-side MPU 611 transitions (switches) from the normal-operation mode (controlled-operation state) to the sleep mode (low-power operation state), in which electric power consumption is curtailed by stopping (shutting or powering down) a portion of the microprocessor operation (processing functions). Before transitioning from the normal-operation mode to the sleep mode, the equipment-side MPU 611 transmits, via the equipment-side communication part 619, a sleep-transition signal Sa2 to the MPU 620. The sleep-transition signal Sa2 is a parameter signal that indicates that the equipment-side MPU 611 of the charger 600 has transitioned to the sleep mode.

If a signal is input to any of the interrupt ports PI during the sleep mode, the equipment-side MPU 611 wakes up and transitions to the normal-operation mode. For example, if a state of connection with the battery pack 100 is detected and connection-detection information Sb1 is input via the interrupt ports PI, then the equipment-side MPU 611 wakes up. In addition, if the removal of the battery pack 100 from the charger 600 is detected and the prescribed condition(s) is (are) satisfied, then the equipment-side MPU 611 transitions to the sleep mode.

The MPU 620 and the equipment-side MPU 611 communicate, according to a serial communication protocol (standard), via the communication part 400, the TR terminal 15, the equipment-side TR terminal 65, and the equipment-side communication part 619. The MPU 620 and the equipment-side MPU 611 are configured such that, while a communication connection is established, communication is performed every predetermined communication period Tc (e.g., Tc=8 seconds). The MPU 620, the communication part 400, and the TR terminal 15 are configured to enable (execute) duplex (bidirectional or two-way) communication between the battery pack 100 and the charger 600.

The DS terminal 16 is connected to the discharging-control part 500. When the battery pack 100 is connected to the external equipment (in particular, the electric work machine), the DS terminal 16 outputs a discharging-enabled signal or a discharging-disabled signal to the external equipment. Based on the discharging-enabled signal or the discharging-disabled signal input from the MPU 620, the discharging-control part 500 outputs a discharging-enabled signal or a discharging-disabled signal via the DS terminal 16. In addition, when the battery pack 100 in the shutdown state is connected to the charger 600, the DS terminal 16 inputs electric power from the auxiliary power supply 623 via the equipment-side DS terminal 66.

1-2. Processing-Mode Switching Process

Figure 2:
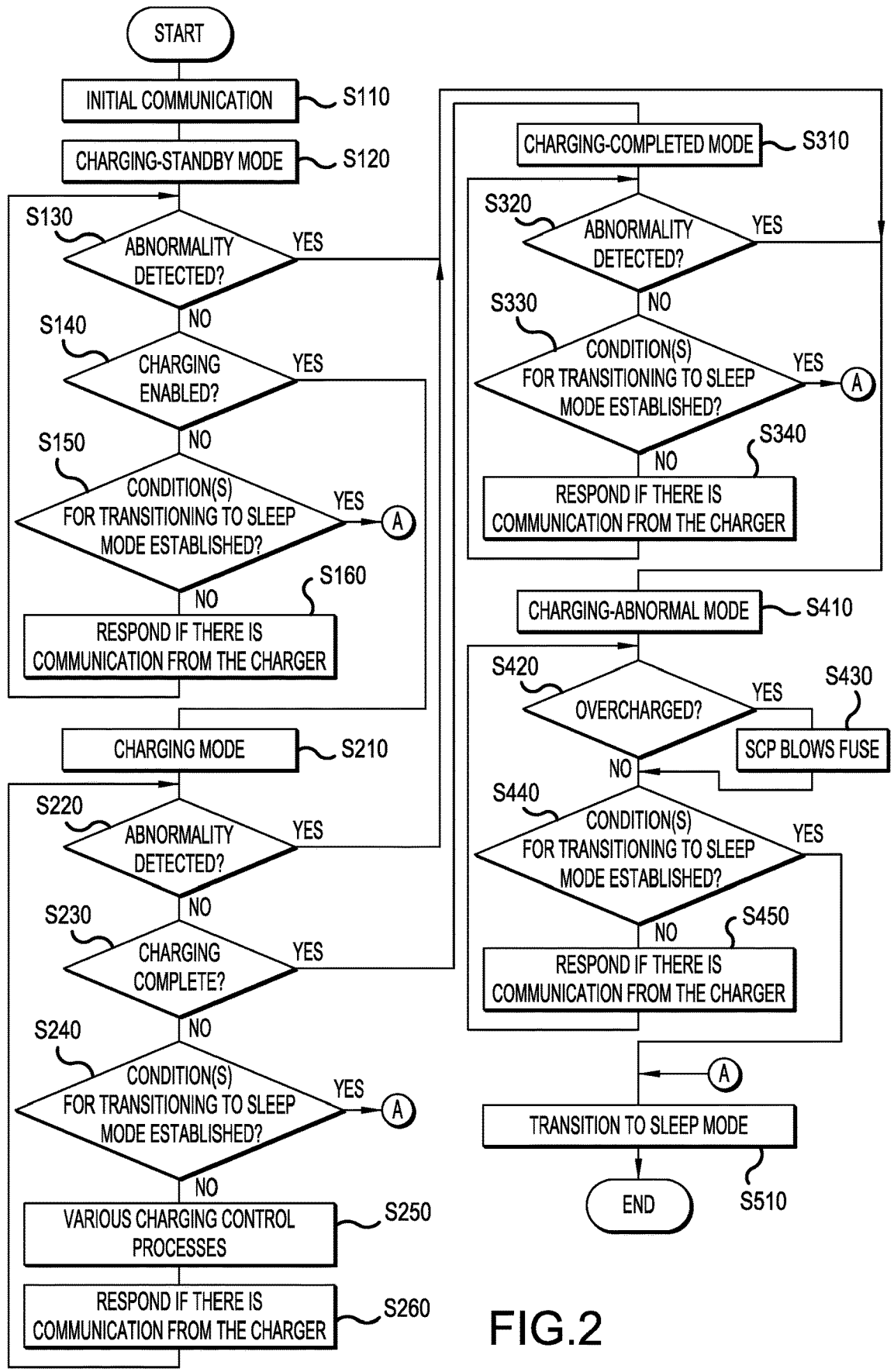
FIG. 2 is a flow chart that describes the processing details of a processing-mode switching process that may be executed in the first embodiment of the present disclosure.

In the following, a representative, non-limiting processing-mode switching process (algorithm), which is executed by the MPU 620, will be explained, with reference to the flow chart shown in FIG. 2.

The processing-mode switching process (program, algorithm) is executed by the MPU 620 when the MPU 620 is in the normal-operation mode (controlled-operation state). At least four modes, namely, a charging-standby mode, a charging mode, a charging-completed mode, and a charging-abnormal mode, are provided as the processing modes in the normal-operation mode.

When the detection part 300 detects that the battery pack 100 is electrically connected with the charger 600 and connection-detection information Sa1 is input via the interrupt ports PI, the MPU 620 wakes up, starts operation in the normal-operation mode (controlled-operation state), and starts the processing-mode switching process.

When the MPU 620 starts the processing-mode switching process, the MPU 620 first executes an initial communication process in S110 (S indicates a step). The initial communication process is a process for confirming that transmission and reception of signals back and forth between the battery pack 100 and the charger 600 are possible. If the initial communication process completes normally, the MPU 620 transitions to S120; on the other hand, if the initial-communication process does not complete normally due to some abnormality, then it is determined that the communication state between the battery pack 100 and the charger 600 is in an abnormal state, and the processing-mode switching process ends.

If the MPU 620 transitions to the following step S120, then the MPU 620 starts operation in the charging-standby mode. The charging-standby mode is a processing mode that, after the battery pack 100 has been connected to the charger 600, stands by until it is determined that charging by the AFE 610 is enabled.

In the following step S130, the MPU 620 determines whether an abnormality has been detected in the battery pack 100. If an abnormality has been detected (a YES determination), then the MPU 620 transitions to S410; on the other hand, if an abnormality has not been detected (a NO determination), then the MPU 620 transitions to S140. If an abnormality occurs in the battery pack 100 or, for example, in the situation in which a charging-disabled signal is received from the AFE 610, then the MPU 620 makes a YES determination and transitions to S410.

If the MPU 620 transitions to S140, then the MPU 620 determines whether or not charging is enabled. The MPU 620 transitions to S210 if charging is enabled (a YES determination) or transitions to S150 if charging is not enabled (a NO determination). For example, if a charging-enabled signal is being received from the AFE 610, then the MPU 620 makes a YES determination and transitions to S210.

If the MPU 620 transitions to S150, then the MPU 620 determines whether one or more conditions for transitioning to the sleep mode is (are) established. The MPU 620 transitions to S510 if the condition(s) is (are) established (a YES determination) or transitions to S160 if the condition(s) is (are) not established (a NO determination). The MPU 620 determines, by executing a sleep-mode-transition determining routine, whether the condition(s) for transitioning to the sleep mode is (are) established.

Figure 3:
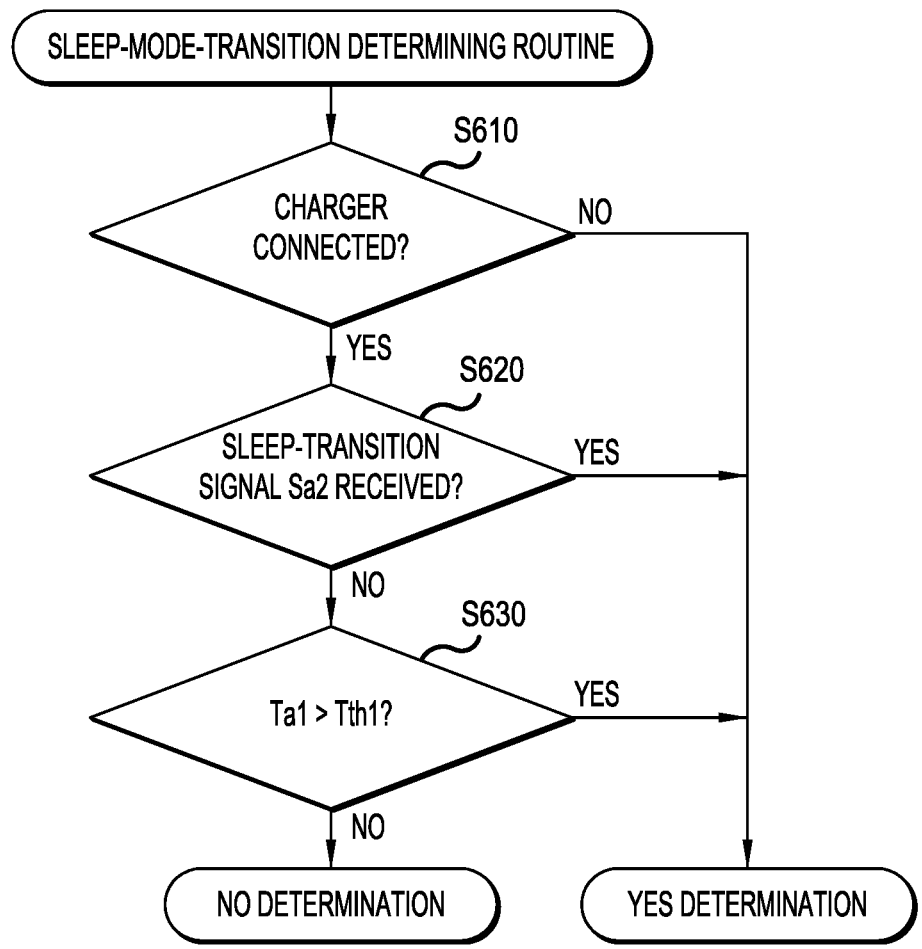
FIG. 3 is a flow chart that describes the processing details of a sleep-mode-transition determining routine (module) that may be executed in the first embodiment of the present disclosure.

If the MPU 620 starts the sleep-mode-transition determining routine shown in FIG. 3, then, first, in S610, the MPU 620 determines whether or not the charger 600 is connected. If the charger 600 is connected (a YES determination), then the MPU 620 transitions to S620; on the other hand, if the charger 600 is not connected (a NO determination), then the MPU 620 sets the determination result for S150 to "YES determination." If connection-detection information Sa1 is input from the detection part 300, then the MPU 620 determines that the charger 600 is connected; on the other hand, if connection-detection information Sa1 is not input from the detection part 300, then the MPU 620 determines that the charger 600 is not connected.

If the MPU 620 transitions to S620, then the MPU 620 determines whether or not a sleep-transition signal Sa2 is being received from the charger 600. If a sleep-transition signal Sa2 is being received (a YES determination), then the MPU 620 sets the determination result for S150 to "YES determination"; on the other hand, if a sleep-transition signal Sa2 is not being received (a NO determination), then the MPU 620 transitions to S630. The sleep-transition signal Sa2 is a parameter signal that indicates that the equipment-side MPU 611 of the charger 600 has transitioned to the sleep mode. Before transitioning from the normal-operation mode to the sleep mode, the equipment-side MPU 611 transmits a sleep-transition signal Sa2 to the MPU 620 via the equipment-side communication part 619.

If the MPU 620 transitions to S630, then the MPU 620 compares a communication-stop time Ta1 and (with, to) a state-switching determination value Tth1. If communication-stop time Ta1 is greater than state-switching determination value Tth1 (i.e. Ta1>Tth1), then the MPU 620 sets the determination result for S150 to "YES determination"; on the other hand, if communication-stop time Ta1 is less than or equal to state-switching determination value Tth1 (i.e. Ta1≤Tth1), then the MPU 620 sets the determination result for S150 to "NO determination."

It is noted that the communication-stop time Ta1 is the duration (time period) in the state (non-communication state) in which the MPU 620, which is monitoring communications (flow of digital information) executed by the communication part 400, has not detected any communication with the charger 600 (the equipment-side MPU 611). The state-switching determination value Tth1 is a predetermined determination value (e.g., Tth1=32 seconds) for use in making the determination to transition to the sleep mode. The state-switching determination value Tth1 is set to an amount of time that is longer than the communication period Tc between the MPU 620 and the equipment-side MPU 611. For example, the state-switching determination value (stored state-switching threshold value) Tth1 preferably falls between 9 seconds and 128 seconds and is, for example, 16 seconds, 24 seconds, 32 seconds, 40 seconds, 48 seconds, 56 seconds, 64 seconds, 72 seconds, 80 seconds, 88 seconds, 96 seconds, 104 seconds, 112 seconds, 120 seconds, or 128 seconds, wherein each of the values mentioned can also be an upper or lower limit of the range mentioned.

If the determination result of the sleep-mode-transition determining routine executed in S150 is a "YES determination," then the MPU 620 transitions to S510 of the processing-mode switching process. On the other hand, if the determination result of the sleep-mode-transition determining routine executed in S150 is a "NO determination," then the MPU 620 transitions to S160 of the processing-mode switching process.

If the MPU 620 transitions to S160, then the MPU 620 determines whether or not there is communication from the charger 600. The MPU 620 executes a responding process (program, algorithm) if there is communication or does not execute the responding process if there is no communication. When S160 ends, the MPU 620 once again transitions to S130.

If the MPU 620 transitions to S210, then the MPU 620 starts operation in the charging mode. The charging mode is a processing mode in which the battery pack 100 (in particular, the battery 60) is charged by the supply of electric power from the charger 600.

In the following step S220, the MPU 620 determines whether or not an abnormality in the battery pack 100 is being detected. The MPU 620 transitions to S410 if an abnormality is detected (a YES determination) or transitions to S230 if an abnormality is not detected (a NO determination). The determining method of S220 is the same as that of S130.

If the MPU 620 transitions to S230, then the MPU 620 determines whether or not charging has completed. The MPU 620 transitions to S310 if charging has completed (a YES determination) or transitions to S240 if charging has not completed (a NO determination). For example, the MPU 620 determines that charging has completed if the voltage of the battery 60 detected by the AFE 610 is greater than a predetermined charging-completed determination value Vth1 (e.g., a value equivalent to the rated voltage of the battery 60).

If the MPU 620 transitions to S240, then the MPU 620 determines whether or not the condition(s) for transitioning to the sleep mode is (are) established. The MPU 620 transitions to S510 if the condition(s) is (are) established (a YES determination) or transitions to S250 if the condition(s) is (are) not established (a NO determination). The same as in S150 described above, the MPU 620 determines, by executing the sleep-mode-transition determining routine (e.g., the routine shown in FIG. 3), whether the condition(s) for transitioning to the sleep mode is (are) established.

If the determination result of the sleep-mode-transition determining routine executed in S240 is a "YES determination," then the MPU 620 transitions to S510 of the processing-mode switching process. If the determination result of the sleep-mode-transition determining routine executed in S240 is a "NO determination," then the MPU 620 transitions to S250 of the processing-mode switching process.

If the MPU 620 transitions to S250, then the MPU 620 executes various charging-control processes (programs, algorithms). As the various charging-control processes, the MPU 620 executes control processes such as, for example, a constant-voltage-charging control process and a constant-current-charging control process using the supply of electric power from the charger 600. When S250 ends, the MPU 620 transitions to S260.

If the MPU 620 transitions to S260, then the MPU 620 determines whether or not there is communication from the charger 600. The MPU 620 executes the responding process if there is communication or does not execute the responding process if there is no communication. The processing details of S260 are the same as those of S160. When S260 ends, the MPU 620 once again transitions to S220.

If the MPU 620 transitions to S310, then the MPU 620 starts operation in the charging-completed mode. The charging-completed mode is a processing mode that is in effect from after the charging of the battery pack 100 (in particular, the battery 60) has been completed until the battery pack 100 is removed from the charger 600.

In the following step S320, the MPU 620 determines whether or not an abnormality in the battery pack 100 is detected. The MPU 620 transitions to S410 if an abnormality is detected (a YES determination) or transitions to S330 if an abnormality is not detected (a NO determination). The determining method of S320 is the same as that of S130.

If the MPU 620 transitions to S330, then the MPU 620 determines whether or not the condition(s) for transitioning to the sleep mode is (are) established. The MPU 620 transitions to S510 if the condition(s) is (are) established (a YES determination) or transitions to S340 if the condition(s) is (are) not established (a NO determination). The same as in S150 described above, the MPU 620 determines, by executing the sleep-mode-transition determining routine (e.g., the routine shown in FIG. 3), whether the condition(s) for transitioning to the sleep mode is (are) established.

If the determination result of the sleep-mode-transition determining routine executed in S330 is a "YES determination," then the MPU 620 transitions to S510 of the processing-mode switching process. On the other hand, if the determination result of the sleep-mode-transition determining routine executed in S330 is a "NO determination," then the MPU 620 transitions to S340 of the processing-mode switching process.

If the MPU 620 transitions to S340, then the MPU 620 determines whether or not there is communication from the charger 600. The MPU 620 executes the responding process if there is communication or does not execute the responding process if there is no communication. The processing details of S340 are the same as those of S160. When S340 ends, the MPU 620 once again transitions to S320.

If the MPU 620 transitions to S410, then the MPU 620 starts operation in the charging-abnormal mode. The charging-abnormal mode is a processing mode in which the MPU 620 determines whether or not the abnormal state of the battery pack 100 is a state that requires the SCP 118 to ensure safety.

In the following step S420, the MPU 620 determines whether or not the battery 60 is in the overcharged state. The MPU 620 transitions to S430 if a positive determination is made (a YES determination) or transitions to S440 if a negative determination is made (a NO determination). The MPU 620 makes a determination that the battery 60 is in the overcharged state if, for example, the voltage of the battery 60 detected by the AFE 610 is greater than a predetermined overcharge determination value Vth2 (e.g., a value higher than the rated voltage of the battery 60, such as equivalent to 110%, 120% or 130% of the rated voltage of the battery 60 or any range defined by these values).

In S430, the MPU 620 outputs a blow-fuse instruction to the SCP 118. Thereby, the state results in which the fuse of the SCP 118 is blown and the positive-electrode-side connection line is broken (interrupted), whereby the battery 60 enters the state in which charging and discharging via the positive-electrode terminal 11 is impossible unless and until the fuse is replaced.

If the MPU 620 transitions to S440, then the MPU 620 determines whether or not the condition(s) for transitioning to the sleep mode is (are) established. The MPU 620 transitions to S510 if the condition(s) is (are) established (a YES determination) or transitions to S450 if the condition(s) is (are) not established (a NO determination). The same as in S150 described above, the MPU 620 determines, by executing the sleep-mode-transition determining routine (e.g., of FIG. 3), whether the condition(s) for transitioning to the sleep mode is (are) established.

If the MPU 620 transitions to S450, then the MPU 620 determines whether or there is communication from the charger 600. The MPU 620 executes the responding process if there is communication or does not execute the responding process if there is no communication. The processing details of S450 are the same as those of S160. When S450 ends, the MPU 620 once again transitions to S420.

If the MPU 620 transitions to S510, then the MPU 620 executes a process in which the MPU 620 transitions from the normal-operation mode (controlled-operation state) to the sleep mode (low-power operation state). When S510 ends, the processing-mode switching process ends and the transition of the MPU 620 to the sleep mode is complete.

1-3. Effects

As explained above, the battery pack 100 of the present embodiment comprises the MPU 620, which is configured to be switchable to any of a plurality of operation modes (operation states), which include the normal-operation mode (controlled-operation state) and the sleep mode (low-power operation state or low power mode).

In addition, the MPU 620 is configured to compare the communication-stop time Ta1 and (to, with) the state-switching determination value Tth1 by executing S630 of the sleep-mode-transition determining routine. As a result of this comparison, the operation state of the MPU 620 is not switched if the communication-stop time Ta1 is less than or equal to the state-switching determination value Tth1 (a NO determination in S630). The MPU 620 is configured such that, when S630 is executed, the operation state of the MPU 620 is switched to the sleep mode (low-power operation state) if the communication-stop time Ta1 is greater than the state-switching determination value Tth1 (a YES determination in S630).

When the communication-stop time Ta1 exceeds the state-switching determination value Tth1 after the battery pack 100 has been connected to the charger 600 and charging has been completed, the battery pack 100 configured in the above-described manner can reduce the amount of electric power consumed by the MPU 620 by switching the operation state of the MPU 620 to the sleep mode or another low-power (or zero power) operation state. Thereby, the battery pack 100 can reduce the wasteful consumption of the electric power that was charged in the battery 60 during the last recharging operation.

Because the communication part 400 of the battery pack 100 is configured to communicate with the charger 600 according to a serial communication protocol, not only is it possible to enable (execute, perform) communication of simple ON/OFF signals between the battery pack 100 and the charger 600, but it also becomes possible to transmit and receive signals that contain a variety of types of information.

In addition, if the communication part 400 of the battery pack 100 communicates with the charger 600 according to duplex (bidirectional or two-way) communication protocol (standard) instead of according to a simplex (unidirectional or one-way) communication protocol (standard), information can be exchanged back and forth between the communication part 400 (battery pack 100) and the charger 600.

Consequently, the battery pack 100 can receive information related to the state (normal state, abnormal state, etc.) of the charger 600 and can notify the charger 600 of the information related to the state (normal state, abnormal state, etc.) of the battery pack 100.

Furthermore, the MPU 620 of the above-described exemplary embodiment is configured such that, by executing the processing-mode switching process in the normal-operation mode (controlled-operation state), the MPU 620 executes any one of the plurality of processing modes (the four modes: the charging-standby mode, the charging mode, the charging-completed mode, and the charging-abnormal mode). Therefore, even while any one of the plurality of processing modes is being executed, the MPU 620 compares the communication-stop time Ta1 and the state-switching determination value Tth1 (S630) by executing the sleep-mode-transition determining routine (S150, S240, S330, and S440).

Furthermore, the MPU 620 can switch to the sleep mode or other low-power operation state regardless of the type of the processing mode that is currently being executed by the MPU 620. Thereby, the battery pack 100 can achieve a reduction in the amount of electric power consumed by the MPU 620 in any of the processing modes.

Finally, it is noted that the communication part 400 of the above-described exemplary embodiment is configured to be capable of receiving a sleep-transition signal Sa2 from the charger 600. If the communication part 400 receives a sleep-transition signal Sa2, then the MPU 620 transitions (a positive determination in S620) to the sleep mode (low-power operation state).

Thereby, in the above-described battery pack 100, the MPU 620 transitions to the sleep mode (low-power operation state) upon receiving the sleep-transition signal Sa2 from the charger 600, and therefore the amount of electric power consumed by the MPU 620 can be reduced.

1-4. Correspondence Relationships

The battery pack 100 of the above-described embodiment corresponds to one representative, non-limiting example of a battery pack according to the present teachings, the battery 60 of the above-described embodiment corresponds to one representative, non-limiting example of a battery cell according to the present teachings, and the MPU 620 of the above-described embodiment corresponds to one representative, non-limiting example of a control part or controller according to the present teachings. The MPU 620, the communication part 400, and the TR terminal 15 of the above-described embodiment correspond to one representative, non-limiting example of a communication part or device (receiver-transmitter or transceiver) according to the present teachings. Finally, the MPU 620, which executes S630, of the above-described embodiment corresponds to one representative, non-limiting example of a switching-control part according to the present teachings.

2. Other Embodiments

Although one representative, non-limiting embodiment of the present teachings was explained above in detail, the present disclosure is not limited to the above-mentioned embodiment, and it should be understood that various modifications may be effected within a scope that does not depart from the gist of the present disclosure, such as any of the following modifications.

(2a) Although a case was explained in the above-mentioned embodiment in which serial communication is used as the method of communication between the battery pack (the communication part 400) and the charger, the method of communication is not limited to serial communication, and other methods of communication, such as parallel communication and multiplex communication, may instead be used. In addition, although a case was explained in the above-mentioned embodiment in which duplex (bidirectional or two-way) communication is used as the method of communication between the battery pack (the communication part 400) and the charger, simplex communication may instead be used.

(2b) The various numerical values (state-switching determination value Tth1=32 seconds, communication period Tc=8 seconds, and the like) in the above-mentioned embodiment are merely examples and may be other appropriate values in accordance with the application, the usage environment, and the like of the battery pack.

(2c) In the above-mentioned embodiment, any function that is implemented with just one structural element may be implemented by a plurality of structural elements, any function implemented by a plurality of structural elements may be integrated into one structural element, and the like. In addition, at least one portion of the configuration of the above-mentioned embodiment may be substituted by any well-known configuration having the same function. In addition, a portion of the configuration of the above-mentioned embodiment may be omitted. In addition, at least a portion of the configuration of the above-entioned embodiment may supplement or replace some other configuration of the above-mentioned embodiment. It is noted that every aspect included in the technical concept specified by only the text recited in the claims is the embodiment of the present disclosure.

Representative, non-limiting examples of the present invention were described above in detail with reference to the attached drawings. This detailed description is merely intended to teach a person of skill in the art further details for practicing preferred aspects of the present teachings and is not intended to limit the scope of the invention. Furthermore, each of the additional features and teachings disclosed above may be utilized separately or in conjunction with other features and teachings to provide improved battery packs.

Moreover, combinations of features and steps disclosed in the above detailed description may not be necessary to practice the invention in the broadest sense, and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

Although some aspects of the present disclosure have been described in the context of a device, it is to be understood that these aspects also represent a description of a corresponding method, so that each block, part or component of a device, such as the AFE 610, MPU 611 and/or the control part 620, is also understood as a corresponding method step or as a feature of a method step. In an analogous manner, aspects which have been described in the context of or as a method step also represent a description of a corresponding block, part, detail, algorithm or feature of a corresponding device, such as the AFE 610, MPU 611 and/or the control part 620.

Depending on certain implementation requirements, exemplary embodiments of the MPU 611 and/or the control part (controller) 620 of the present disclosure may be implemented in hardware and/or in software. The implementation can be configured using a digital storage medium (non-transitory computer-readable medium), for example one or more of a ROM, a PROM, an EPROM, an EEPROM or a flash memory, on which electronically readable control signals (program code—computer-readable instructions) are stored, which interact or can interact with a programmable hardware component such that the respective method is performed.

A programmable hardware component can be formed by a processor, a computer processor (CPU=central processing unit), an application-specific integrated circuit (ASIC), an integrated circuit (IC), a computer, a system-on-a-chip (SOC), a programmable logic element, or a field programmable gate array (FGPA) including a microprocessor.

The digital storage medium can therefore be machine- or computer readable. Some exemplary embodiments thus comprise a data carrier or non-transient computer readable medium which includes electronically readable control signals which are capable of interacting with a programmable computer system or a programmable hardware component such that one of the methods described herein is performed. An exemplary embodiment is thus a data carrier (or a digital storage medium or a non-transient computer-readable medium) on which the program for performing one of the methods described herein is recorded.

In general, exemplary embodiments of the present disclosure, in particular the MPU 611 and/or the control part (controller) 620, are implemented as a program, firmware, computer program, or computer program product including a program, or as data, wherein the program code or the data is operative to perform one of the methods if the program runs on a processor or a programmable hardware component. The program code or the data can for example also be stored on a machine-readable carrier or data carrier. The program code or the data can be, among other things, source code, machine code, bytecode or another intermediate code.

A program according to an exemplary embodiment can implement one of the methods during its performing, for example, such that the program reads storage locations or writes one or more data elements into these storage locations, wherein switching operations or other operations are induced in transistor structures, in amplifier structures, or in other electrical, optical, magnetic components, or components based on another functional principle. Correspondingly, data, values, sensor values, or other program information can be captured, determined, or measured by reading a storage location. By reading one or more storage locations, a program can therefore capture, determine or measure sizes, values, variable, and other information, as well as cause, induce, or perform an action by writing in one or more storage locations, as well as control other apparatuses, machines, and components, and thus for example also perform complex processes in the MPU 611 and/or the control part 620.

Therefore, although some aspects of the MPU 611 and/or the control part 620 have been identified as "parts" or "steps", it is understood that such parts or steps need not be physically separate or distinct electrical components, but rather may be different blocks of program code that are executed by the same hardware component, e.g., one or more microprocessors.

Additional embodiments of the present teachings include, but are not limited to:
1. A battery pack, which is charged by a charger, comprising:
a battery cell having a rechargeable battery capable of being charged and discharged;
a control part configured to be switchable to any of a plurality of operation states, which include a controlled-operation state, in which charging and discharging of the battery cell are controlled, and a low-power operation state, in which control of charging and discharging of the battery cell is not performed and electric power consumption is less than that of the controlled-operation state; and
a communication part, which performs communication with the charger;
and further comprising a switching-control part that:
compares a communication-stop time, which is the duration of a state in which the communication part does not detect communication with the charger, and a predetermined state-switching determination value;
does not switch the operation state of the control part if the communication-stop time is less than or equal to the state-switching determination value; and
does switch the operation state of the control part to the low-power operation state if the communication-stop time exceeds the state-switching determination value.

2. The battery pack according to the above-embodiment 1, wherein the communication part performs serial communication as the communication with the charger.
3. The battery pack according to the above-embodiment 1 or 2, wherein the communication part performs duplex communication as the communication with the charger.
4. The battery pack according to any one of the above-embodiments 1-3, wherein:
the control part is configured to execute, in the controlled-operation state, any one of a plurality of processing modes that includes a charging-standby mode, a charging mode, a charging-completed mode, and a charging-abnormal mode; and
the switching-control part compares the communication-stop time and the state-switching determination value even during execution of any of the processing modes of the plurality of processing modes of the control part.
5. The battery pack according to any one of the above-embodiments 1-4, wherein:
the communication part is configured such that it is capable of receiving a sleep-transition signal from the charger; and
the control part transitions to the low-power operation state when the communication part receives the sleep-transition signal.

EXPLANATION OF THE REFERENCE NUMBERS

60 Battery
100 Battery pack
116 Power-supply circuit
200 Charging-control part (CS circuit)
300 Detection part (DT circuit)
400 Communication part (UART half-duplex I/F circuit)
500 Discharging-control part (DS circuit)
600 Charger
611 Equipment-side MPU
613 Equipment-side, power-supply circuit
615 Discharge switch
617 Interlock circuit
619 Equipment-side communication part
620 MPU (microprocessor unit)
621 Shunt resistor
623 Auxiliary power supply
630 Battery-detection part

The invention claimed is:
1. A battery pack comprising:
a rechargeable battery cell including a positive electrode and a negative electrode;
a first non-charging connector configured to be connected to an external equipment, the external equipment being configured to be detachably attached to the battery pack; and
a control circuit configured to be selectively switched between a controlled-operation state and a low-power operation state,
the control circuit in the controlled-operation state being configured to control charging and discharging of the battery cell, and
the control circuit in the low-power operation state being configured (i) to consume less electric power than in the controlled-operation state and (ii) to output a discharging-enabled signal to the first non-charging connector.

* * * * *